US011055282B1

(12) United States Patent
Fletcher

(10) Patent No.: US 11,055,282 B1
(45) Date of Patent: Jul. 6, 2021

(54) TRANSLATING GRAPH QUERIES INTO EFFICIENT NETWORK PROTOCOL REQUESTS

(71) Applicants: Atlassian Pty Ltd, Sydney (AU); Atlassian, Inc., San Francisco, CA (US)

(72) Inventor: Cameron Fletcher, Austin, TX (US)

(73) Assignees: ATLASSIAN PTY LTD., Sydney (AU); ATLASSIAN INC., San Francisco, CA (US)

(*) Notice: Subject to any disclaimer, the term of this patent is extended or adjusted under 35 U.S.C. 154(b) by 0 days.

(21) Appl. No.: 16/836,061

(22) Filed: Mar. 31, 2020

(51) Int. Cl.
| G06F 16/2452 | (2019.01) |
| G06F 16/955 | (2019.01) |
| H04L 29/06 | (2006.01) |
| G06F 16/901 | (2019.01) |
| H04L 29/08 | (2006.01) |
| G06F 16/953 | (2019.01) |

(52) U.S. Cl.
CPC .... *G06F 16/24526* (2019.01); *G06F 16/9024* (2019.01); *G06F 16/953* (2019.01); *G06F 16/9566* (2019.01); *H04L 67/02* (2013.01); *H04L 67/42* (2013.01)

(58) Field of Classification Search
USPC .......................................................... 707/763
See application file for complete search history.

(56) References Cited

U.S. PATENT DOCUMENTS

| 6,654,741 | B1 * | 11/2003 | Cohen ................. G06F 16/9566 |
| 8,819,109 | B1 * | 8/2014 | Krishnamurthy .. G06Q 30/0277 |
| | | | 709/203 |
| 10,305,985 | B1 * | 5/2019 | Ma ...................... G06F 16/2455 |
| 10,521,195 | B1 * | 12/2019 | Swope ...................... G06F 8/34 |
| 2003/0120670 | A1 * | 6/2003 | Nareddy ............... G06Q 30/02 |
| 2006/0070022 | A1 * | 3/2006 | Ng ......................... G06F 16/958 |
| | | | 717/104 |
| 2008/0147655 | A1 * | 6/2008 | Sinha ................... G06F 16/288 |
| 2008/0222083 | A1 * | 9/2008 | Lim ..................... G06F 16/9566 |
| 2011/0238733 | A1 * | 9/2011 | Yoo ........................ G06F 11/008 |
| | | | 709/203 |
| 2013/0067115 | A1 * | 3/2013 | Lapanc ................. H04L 61/106 |
| | | | 709/245 |
| 2014/0094194 | A1 * | 4/2014 | Schwent ............... H04W 4/029 |
| | | | 455/456.3 |
| 2014/0117076 | A1 * | 5/2014 | Eberlein ............. G06F 16/9566 |
| | | | 235/375 |

(Continued)

*Primary Examiner* — Cam Linh T Nguyen
(74) *Attorney, Agent, or Firm* — Brownstein Hyatt Farber Schreck, LLP

(57) ABSTRACT

In an embodiment, a method comprises creating and storing a parameter mapping that maps a plurality of resources to a plurality of HTTP URL parameters; receiving, at a client computer, a query comprising a request to access one or more resources of the plurality of resources; using the parameter mapping, determining one or more HTTP URL parameters of the plurality of HTTP URL parameters that are mapped to the one or more resources of the plurality of resources specified in the query; generating a HTTP URL by combining the one or more HTTP URL parameters; submitting a request to a server computer based on the HTTP URL that causes the server computer to retrieve the one or more resources of the plurality of resources.

20 Claims, 4 Drawing Sheets

(56) References Cited

U.S. PATENT DOCUMENTS

| | | | |
|---|---|---|---|
| 2014/0129733 A1* | 5/2014 | Klais | H04L 45/22 |
| | | | 709/239 |
| 2015/0134734 A1* | 5/2015 | Bishop | H04L 67/303 |
| | | | 709/203 |
| 2017/0214759 A1* | 7/2017 | Timiskov | H04L 67/10 |
| 2017/0295057 A1* | 10/2017 | Dost | H04W 4/70 |
| 2017/0359400 A1* | 12/2017 | Demulder | G06F 16/00 |
| 2018/0198839 A1* | 7/2018 | Demulder | H04L 41/32 |
| 2018/0210966 A1* | 7/2018 | Bedi | G06F 16/90335 |
| 2019/0116153 A1* | 4/2019 | Deverakonda Venkata | |
| | | | H04L 67/02 |
| 2019/0196890 A1* | 6/2019 | Bucchi | G06F 16/24545 |
| 2019/0205436 A1* | 7/2019 | Hemio | G06F 16/252 |
| 2019/0310840 A1* | 10/2019 | Dufresne | G06Q 10/101 |
| 2019/0370370 A1* | 12/2019 | Wittern | G06F 9/54 |
| 2020/0004730 A1* | 1/2020 | Brown | G06F 9/5072 |
| 2020/0106658 A1* | 4/2020 | A | H04L 41/0853 |
| 2020/0204618 A1* | 6/2020 | Agarwal | H04L 9/0643 |

\* cited by examiner

TRANSLATING GRAPH QUERIES INTO EFFICIENT NETWORK PROTOCOL REQUESTS

TECHNICAL FIELD

One technical field of the present disclosure is query language processing. Another technical field is computer-implemented application programming interface (API) management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

GraphQL is a data query language developed internally by Facebook and publicly released in 2015. It provides an alternative to representational state transfer (REST) and ad-hoc web service architectures. It allows client processes to define the structure of the data required, and exactly the same structure of the data is returned from the server. It is a strongly typed runtime which allows clients to dictate what data is needed, therefore preventing excessively large amounts of data from being returned. Significant GraphQL clients include Apollo Client and Relay. GraphQL servers are available for multiple languages, including JavaScript, Python, Ruby, Java, C#, Scala, Go, Elixir, Erlang, PHP, and Clojure. GraphQL also includes a Schema Definition Language (SDL).

While GraphQL has many benefits, its use is largely underdeveloped. Considering the current state of the industry, there is a need for improved systems, methods of using GraphQL to enhance external APIs, through optimizing GraphQL queries to efficiently access existing REST APIs.

DESCRIPTION OF EXAMPLE EMBODIMENTS

Figure 1:
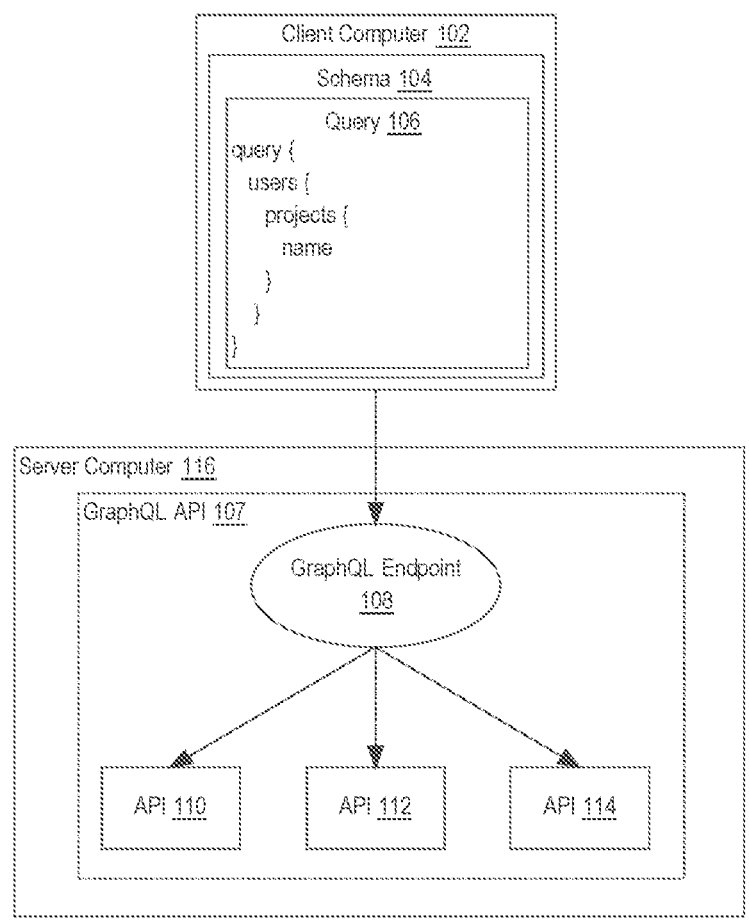
FIG. 1 illustrates a GraphQL query architecture.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein. Furthermore, all embodiments are directed to computer-implemented data processing methods, computer systems, and/or computer-readable data storage media that have been programmed to execute or operate using particular new techniques, and not to concepts, functions or ideas in the abstract.

Embodiments are described in sections according to the following outline:

1. OVERVIEW
2. EXAMPLE GRAPH QUERY LANGUAGE
3. TRANSLATING GRAPH QUERIES TO REST API REQUESTS
4. CLIENT-SIDE QUERY ARCHITECTURE
5. EXAMPLE PROCEDURE
6. HARDWARE OVERVIEW
7. EXTENSIONS AND ALTERNATIVES

1. Overview

The following describes systems and methods for addressing needs such as described above, among other needs, by translating graph queries into efficient HTTP requests.

In an embodiment, a method comprises creating and storing a parameter mapping that maps a plurality of resources, i.e. objects and/or fields, to a plurality of HTTP URL parameters; receiving, at a client computer, a query comprising a request to access one or more resources of the plurality of resources; using the parameter mapping, determining one or more HTTP URL parameters of the plurality of HTTP URL parameters that are mapped to the one or more resources of the plurality of resources specified in the query; generating a HTTP URL by combining the one or more HTTP URL parameters; submitting a request to a server computer based on the HTTP URL that causes the server computer to retrieve the one or more resources of the plurality of resources. In some embodiments, the one or more resources of the plurality of resources include one or more nested resources, i.e. resources that are logically children of other resources.

Using the single HTTP URL, a single request can be issued to a server that is responsive to REST API requests. The single request results in a single round trip to a datastore to retrieve resources that would normally require multiple API calls and multiple rounds trips to a database to complete. Thus, by minimizing REST API requests and round trips to a datastore, techniques discussed herein conserve numerous computing resources and network bandwidth for servicing nested query based requests.

Other aspects, features and embodiments will become apparent from the disclosure as a whole.

2. Example Graph Query Language

A graph query language processing system is a specification that defines how to fetch data from a backend system. To illustrate clear examples, this disclosure will refer to GraphQL for use in some embodiments, but other embodiments may use other graph query language systems that are functionally similar or equivalent to GraphQL, and GraphQL is not required in every embodiment. GraphQL, as an example, is similar to REST and often uses the same HTTP(s) transports as REST. However, rather than using various path-based URIs and HTTP verbs, GraphQL uses a single endpoint with a defined schema that specifies how to not only fetch data but also mutate, or change, data. As discussed herein, an 'endpoint' is a URI or URL that is used to make a request.

Building a GraphQL service requires a schema to be defined by various schema definition elements that describe the types, fields, and queries available for the service. A schema is a contract between the server and the client that specifies not only what data is available but also what types of data is available and how individual pieces of data are related.

The core building block within a schema is the type. Types provide a wide-range of functionality within a schema, including the ability to: create relationships between types (e.g. between a Book and an Author) and define which data-fetching (querying) and data-manipulation (mutating) operations can be executed by the client.

Every field within a GraphQL schema has either a primitive type, such as int, string, float, boolean, etc., or a complex type. Schemas are composed of classes made up of one or more fields. Clients may select those classes, choosing precisely the relevant fields needed.

```
type Actor {
  name: String
}
type Character {
  name: String
  actor: Actor
}
type Movie {
  name: String
  genre: String
  actors: [Actor]
  characters: [Character]
}
type Query {
  movies: [Movie]
}
```

For example, the above code snippet shows a GraphQL movie-based schema with defined types. Object types describe objects that can be fetched, including what fields the object provides. For example, Movie is an object type, with fields name, genre, actors and characters. [Actor] indicates an array of Actor objects, and [Character] indicates an array of Character objects. The Query type defines the queries available as an entry point for the GraphQL service.

Each type is composed of one or more fields, which can be scalar values or complex objects that refer to other types. All GraphQL queries must at least specify fields to be returned.

GraphQL implements a human-readable schema syntax known as its Schema Definition Language ("SDL") to define schemas. The SDL is used to express the types available within a schema and how those types relate to each other. The declarations, as shown in the above code snippet, express the relationships and the shape of the data to return, not where the data comes from or how it might be stored—which is covered outside the SDL. By drawing the logical connections in the schema definition using SDL, a client is able to see what data is available and request it in a single optimized query.

SDL includes a query type. A GraphQL query is for fetching data and compares to the GET verb in REST-based APIs. In order to define what queries are possible on a server, the Query type is used within the SDL as shown in the above code snippet. The Query type is one of many root-level types which defines functionality for clients and acts as an entry-point to other more specific types within the schema. An example GraphQL query for the above defined schema is shown below:

```
query {
  movies {
    name
    genre
    actors {
      name
    }
  }
}
```

SDL also includes a mutation type. Mutations are operations sent to the server to create, update or delete data. These are comparable to the PUT, POST, PATCH and DELETE verbs on REST-based APIs. Much like how the Query type defines the entry-points for data-fetching operations on a GraphQL server, the root-level mutation type specifies the entry points for data-manipulation operations.

Schemas also support arguments within field selections to further define customization to clients. As an example, a particular numerical metric field may choose to provide a unit argument that specifies what data unit to output the value in. This is in contrast to typical systems that output a value in a single standard unit and rely on documentation to express what unit it is—putting the unnecessary onus on each client to manage the conversions. With GraphQL, the client can specify the precise unit as an argument to the data selection. GraphQL can then manage the conversions and return the appropriate value to the client. Ultimately, this customization allows the logic and control to happen server side, which is often more effective and easier, removing the stress from each client application.

As discussed above, query types describe an entry point into a GraphQL service. GraphQL enables developers to translate their backend data into the application data graph on the frontend using schemas and SDL. This schema defines the types and queries available and then becomes the specification for an API. Once the schema is defined, resolver functions are used for fetching data from remote endpoints.

When a client issues a query to a GraphQL endpoint, each field on each type is resolved by a resolver function at the GraphQL endpoint. A resolver function defines how data is fetched for that field and returns data for that field. Resolvers may query databases, other APIs such as REST based APIs, or data services. This allows resolvers to make use of database clients, network libraries, or any sort of custom data fetching logic.

FIG. 1 illustrates computer system that implements a GraphQL query architecture. Using GraphQL, a client computer 102 first defines a schema 104 using SDL. The client computer 102 then may submit a query 106, based on the schema 104, to a GraphQL endpoint 108. The GraphQL endpoint 108 may exist on a server computer 116 and be accessible over a network 120. The query 106 is received at the GraphQL endpoint 108 and is executed by the server computer 116. Executing the query 106 may comprise GraphQL services executing resolver functions for each field specified in the query. Executing resolver functions may include querying a database, one or more external APIs 110, 112, 114 as part of GraphQL API 107 and/or services, or other REST endpoints. Each API may be implemented as a discrete set of executable instructions. GraphQL services may then format the data as specified by the query 106 and schema 104 and programmatically deliver the result to the client computer 102 in a response message. The result is returned that mirrors the shape of the requested query, typically as JSON or XML.

In a server-side GraphQL implementation such as shown in FIG. 1, a resolver function is executed for every field specified in a query. The resolver functions backing the queries defined in the schema are required to return all possible combinations of data that a query could request. The filtering of this data then occurs at the GraphQL server that returns the query response.

For some queries, such as nested queries, executing a resolver function for every field specified in a query means that a GraphQL server runs the risk of making multiple API requests that result in making more round trips to a database than are necessary for servicing requests.

As discussed herein, a nested query is a query that includes one or more nested resources. A nested resource is a resource that is a child of another resource. A nested resource may include a link or pointer to one or more parent resources. Nested resources allow developers to define relationships between resources and provide structure for effectively accessing and manipulating resources. Additionally, nested resources provide meaning about the relationship between resources in a query and can be useful to developers in issuing queries and debugging.

In a graph query language processing system, a resource such as a nested resource may comprise an object and/or field. Resources, also referred to as nodes, may be electronically digitally stored in different distributed data storage devices to which access is obtained as part of executing the processes described herein.

For example, the below code snippet shows a nested GraphQL query with nested resource 'address':

```
query {
    authors {          # fetches authors (1 query)
        name
        address {      # fetches address for each author (N queries for N authors)
            country
        }
    }
}                      # Therefore = N+1 round trips
```

When the above nested query is received at a GraphQL server, the query is parsed by the GraphQL server and resolver functions are executed to retrieve data for each field specified in the query. The GraphQL server executes a first resolver function that queries an external API and makes a first round trip to a datastore to fetch all of the 'authors' resources. The GraphQL server then executes a second resolver function that queries an external API and makes N round trips to a datastore to fetch the all 'address' resources for the N 'authors'. For example, if the first data fetch returned fifty authors, then the GraphQL server would make fifty-one round trips to retrieve all of the data—one trip to understand that there are fifty 'authors', and fifty trips to retrieve the 'address' for each of the fifty identified 'authors'.

The computing expenditure of performing extra round trips to databases are massive when applied to large requests, for example, by querying a REST API fifty times to retrieve the fifty different addresses of fifty authors. To conserve computing resources, a requestor should be able to fetch all the addresses together with a single API call in a single round trip to a database.

3. Translating Graph Queries to Rest API Requests

To avoid excessive API requests, in an embodiment, a GraphQL query that requests access to multiple resources can be translated into a single HTTP URL that is supported by a REST API.

A local resolver function can be created or defined that traverses a query that requests access to multiple resources, such as a nested query, and generates a single HTTP URL that is supported by a REST API.

For example, the below code snippet illustrates a nested query:

```
query {
    member(id: "me") @client {
        id
        fullName
        boards(filter: open) {
            name
            lists {
                name
            }
        }
        organizations {
            name
            displayName
        }
    }
}
```

As shown above, the resource 'boards' is nested within the 'member' resource and the resource 'lists' is nested within the 'boards' resource. Additionally, the resource 'organizations' is nested within the 'member' resource. To avoid excess API calls and round trips to a database to resolve the nested resources and fields, a local resolver function can be created that translates the above shown nested query to a single HTTP URL. The resolver function includes a parameter mapping that maps resources from the nested query, i.e. objects and fields, to HTTP URL parameters. The HTTP URL parameters can be combined to generate a HTTP URL that is supported by a REST API.

For example, the below code snippet shows a data structure configured to translate a GraphQL query into a single HTTP URL that is supported by an existing REST API. The data structure can be consumed by a local resolver function to translate arbitrary GraphQL queries into corresponding REST API URLs.

```
const VALID_NESTED_RESOURCES: NestedResource[ ] = [
    {
        name: 'member',
        nodeToQueryParams: (node) => ({
            fields: getChildFieldNames(node),
        }),
        nestedResources: [
            {
                name: 'organizations',
                nodeToQueryParams: (node) => ({
                    organizations: getArgument(node, 'filter') || 'all',
                    organization_fields: getChildFieldNames(node),
                }),
            },
            {
                name: 'boards',
                nodeToQueryParams: (node) => ({
                    boards: getArgument(node, 'filter') || 'all',
                    board_fields: getChildFieldNames(node),
                }),
                nestedResources: [
                    {
```

```
        name: 'lists',
        nodeToQueryParams: (node) => ({
          board_lists: getArgument(node, 'filter') || 'all',
          board_list_fields: getChildFieldNames(node),
        }),
      },
    ],
  },
  ],
 },
];
query {
  member(id: "me") @client {
    id
    fullName
    boards(filter: open) {
      name
      lists {
        name
      }
    }
    organizations {
      name
      displayName
    }
  }
}
```

The data structure illustrated above includes programmable logic that uses a parameter mapping to convert resources specified in the nested query to HTTP URL parameters. For the resource 'member', the local resolver is configured to identify fields from the nested query that are associated with the 'member' resource, such as 'id' and 'fullName'. For the nested resource 'organizations', the local resolver is configured to identify arguments and fields from the nested query that are associated with the 'organizations' resource, such as 'all', 'name' and 'displayName'. For the nested resource 'boards', the local resolver is configured to identify arguments and fields from the nested query that are associated with the 'boards' resource, such as 'open' and 'name'. For the nested resource 'lists', the local resolver is configured to identify arguments and fields from the nested query that are associated with the 'lists' resource, such as 'all' and 'name'.

Once the local resolver function identifies the arguments and fields from the nested query for each resource, the local resolver function is configured to convert the identified argument(s) and field(s) for each resource to HTTP URL parameters that are mapped, via the parameter mapping, to each respective resource. For example, the arguments and fields identified for the "member' resource are converted to HTTP URL parameter: 'member/me?fields=id,fullName'. The arguments and fields identified for the 'boards' resource are converted to HTTP URL parameter: 'boards=open&board_fields=name'. The arguments and fields identified for the 'lists' resource are converted to HTTP URL parameter: 'lists=all&list_fields=name'. The arguments and fields identified for the 'organizations' resource are converted to HTTP URL parameter: 'organizations=all&organization_fields=name,displayName'.

Once the HTTP URL parameters for the nested query are determined, the HTTP URL parameters are combined, i.e. concatenated, to generate a single HTTP URL that is supported by a REST API such as:
https://trello.com/l/member/me?fields=id,fullName&boards=open&board_fields=name&board_lists=all&board_list_fields=name&organizations=all&organization_fields=name,displayName Using the single HTTP URL, a single request can be issued to a server that is responsive to REST API requests. The single request results in a single round trip to a datastore to retrieve resources that would normally require multiple API calls and multiple rounds trips to a database to complete. Thus, by minimizing REST API requests and round trips to a datastore, techniques discussed herein conserve numerous computing resources and network bandwidth for servicing nested query based requests.

4. Client-Side Query Architecture

Figure 2:
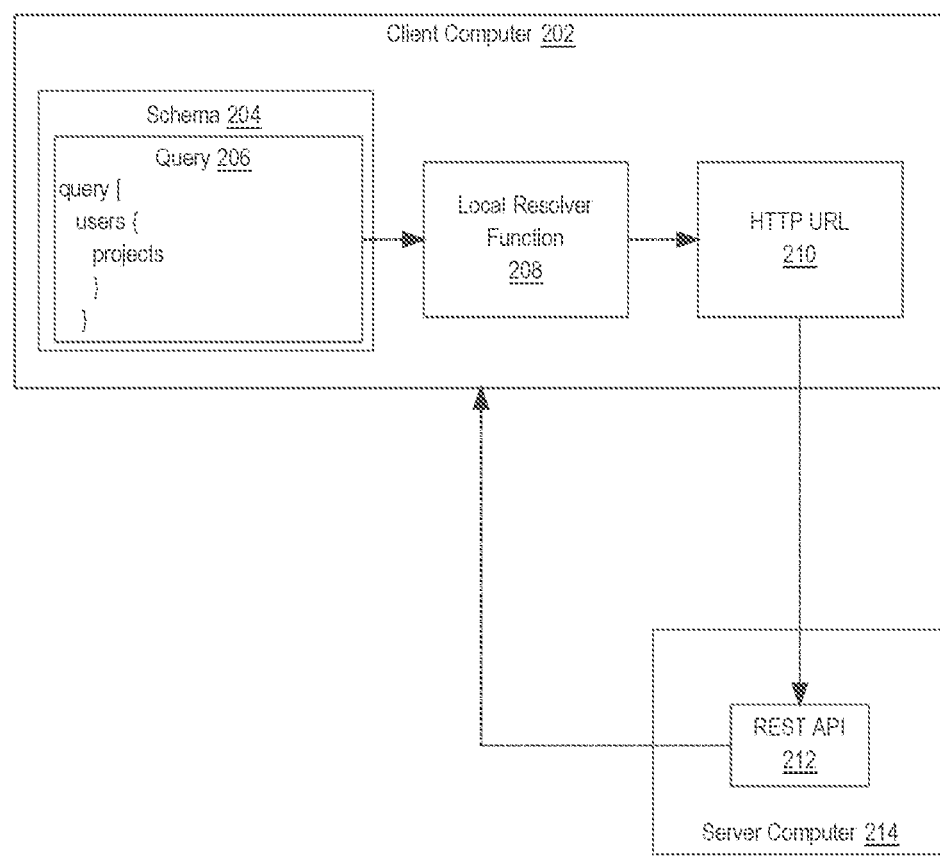
FIG. 2 illustrates a client-side GraphQL query architecture.

A local resolver function can be implemented on a client computing device without the use of a GraphQL endpoint or server. FIG. 2 illustrates a client-side GraphQL query architecture. Using GraphQL, a user on the client computer 202 first defines a schema 204 using SDL. The client computer 202 then may submit a query 206, based on the schema 204, to local resolver function 208. In some embodiments, local resolver function 208 is stored and executed locally at client computer 202. In another embodiment, local resolver function 208 may exist on a server computer, such as GraphQL endpoint 108 from FIG. 1, and be accessible over a network. The query 206 is received at local resolver function 208 and is executed by the client computer 202. Executing the query 206 may comprise client computer 202 executing local resolver function 208 against the query. By executing local resolver function 208, HTTP URL 210 is generated. HTTP URL 210 specifies one or more HTTP URL parameters generated by local resolver function 208. HTTP URL 210 may be input to a web browser executing on client device as a means of sending a data access request to REST API 212, which may be hosted or implemented by a server computer 214. In response to receiving a data access request based on HTTP URL 210, REST API 212 may retrieve the resources specified by HTTP URL parameters specified in HTTP URL 210. REST API 212, or a server computer 214 that implements or hosts REST API 212, may deliver a response to client computer 202 that includes resources specified in the original query 206 or HTTP URL parameters.

5. Example Procedure

Figure 3:
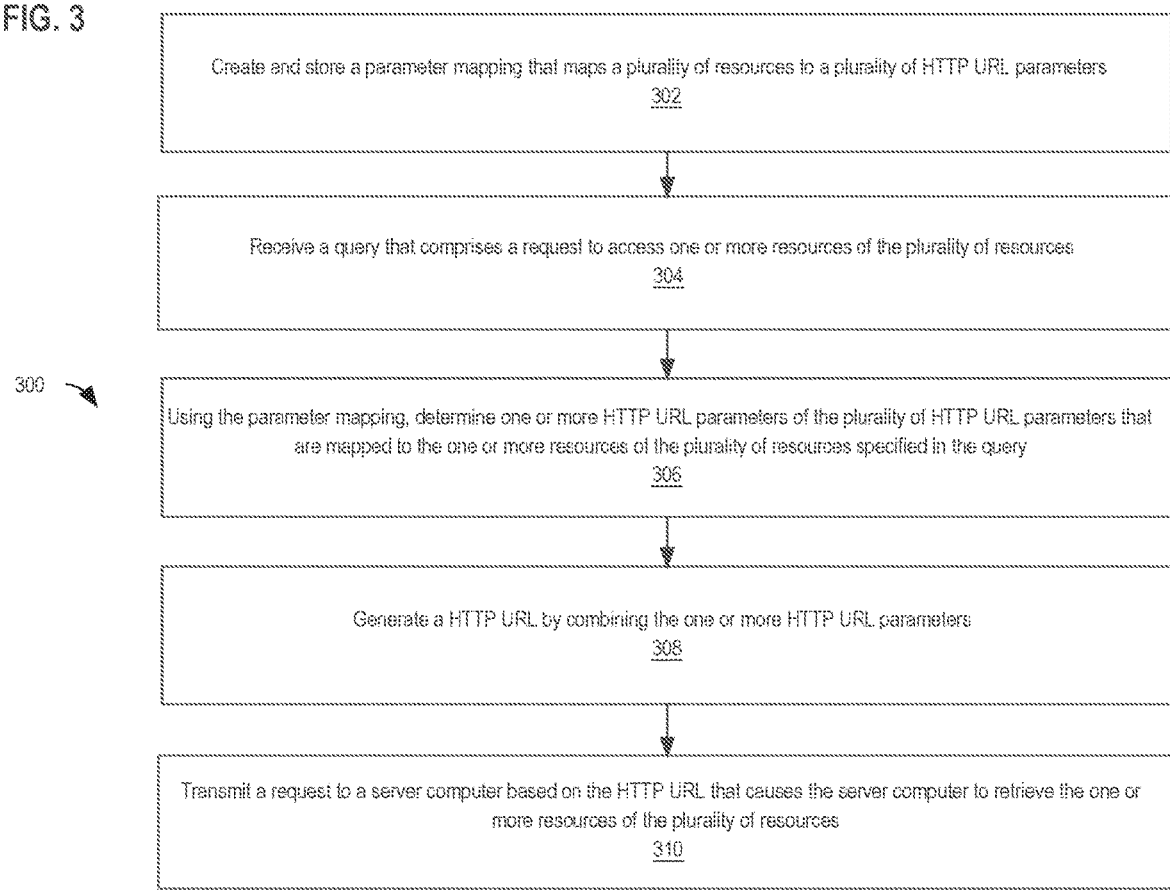
FIG. 3 illustrates an example flowchart of a method for translating graph queries into efficient HTTP requests.

FIG. 3 shows an example flow 300 of a method for translating graph queries into efficient HTTP requests. Although the steps in FIG. 3 are shown in an order, the steps of FIG. 3 may be performed in any order and are not limited to the order shown in FIG. 3. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described. Furthermore, all steps of FIG. 3 are intended to describe machine executable instructions and not functions or operations in the abstract. The steps of flow 300 may be executed by the server computer of FIG. 1, FIG. 2 as further described in this section.

At step 302, a parameter mapping is created and stored that maps a plurality of resources to a plurality of HTTP URL parameters. For example, a user via client computer 202 may create or define a local resolver function 208 that is configured to convert resources specified in a query to HTTP URL parameters based on the parameter mapping. The local resolver function may use the parameter mapping in conjunction with other programmable logic to convert resources specified in a query to HTTP URL parameters.

At step 304, a query is received that comprises a request to access one or more resources of the plurality of resources. The query is based on a schema which indicates which querying operations and mutating operations that a graph query language processing system supports. The schema is defined by a schema definition language (SDL). In some embodiments, the one or more resources of the plurality of resources include one or more nested resources. For example, query 206 is generated at client computer 202 based on schema 204 and is received at client computer 202 for processing. Query 206 may reference one or more resources that may comprise nested resources.

At step 306, using the parameter mapping created in step 302, one or more HTTP URL parameters of the plurality of HTTP URL parameters that are mapped to the one or more resources of the plurality of resources specified in the query are determined. For example, local resolver function 208 executes programmable logic or instructions that convert the one or more resources specified in the query to HTTP URL parameters. As part of the conversion, local resolver function uses the parameter mapping to identify which resources map to URL parameters.

At step 308, a HTTP URL is generated by combining the one or more HTTP URL parameters. Combining the one or more HTTP URL parameters may include concatenating the one or more HTTP URL parameters determined in step 306 to generate the HTTP URL. In some embodiments, the HTTP URL defines an entry point to a representational state transfer (REST) API. For example, client computer 202 may receive the HTTP URL parameters determined in step 306 from the local resolver function 208 and combine the HTTP URL parameters to generate GTTP URL 210.

At step 310, a request is transmitted to a server computer based on the HTTP URL that causes the server computer to retrieve the one or more resources of the plurality of resources. For example, REST API 212 receives a request that includes HTTP URL 210. REST API 212 may be implemented by a server computer 214 The server computer may be configured to be responsive to REST API 212 implemented by the server computer. REST API 212 may interact with a database to retrieve the resources specified HTTP URL 210. The server computer 214 associated with REST API 212 may transmit the retrieved resources to client computer 202 for processing.

6. Implementation Mechanisms—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
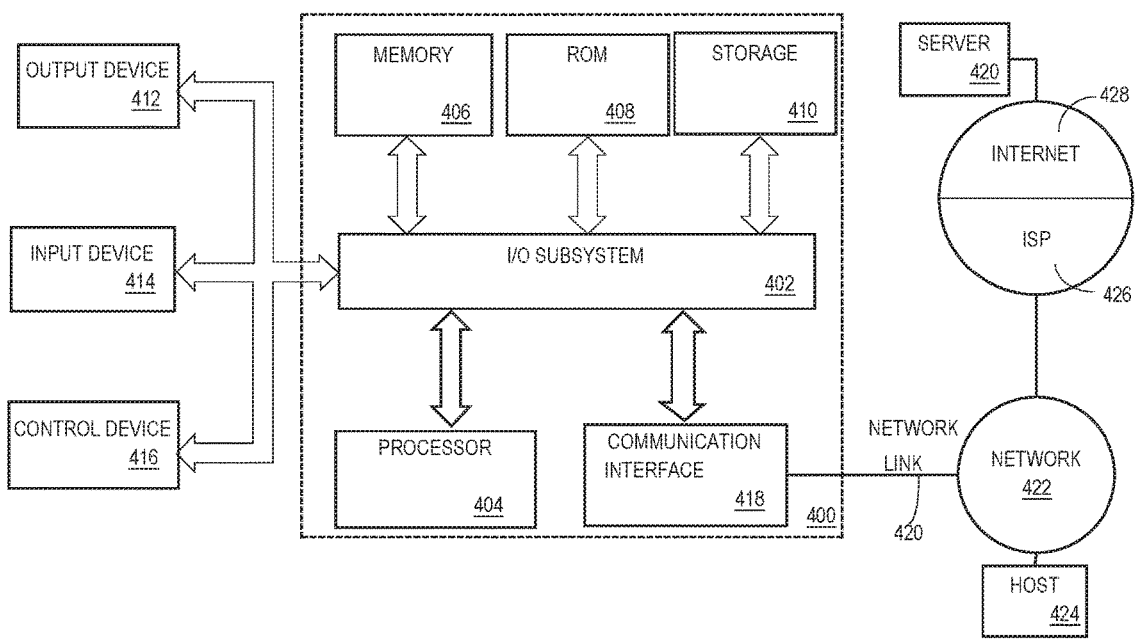
FIG. 4 shows a block diagram of a computer system with which an embodiment of the invention may be implemented.

FIG. 4 is a block diagram that illustrates an example computer system with which an embodiment may be implemented.

In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 204. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 208 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
creating and storing a parameter mapping that maps a plurality of resource parameters to a plurality of hypertext transfer protocol (HTTP) uniform resource locator (URL) parameters;
receiving, at a client computer, a query based on a schema supported by a graph query language processing system and comprising a request to access one or more resources, each resource of the one or more resources associated with a respective resource parameter of the plurality of resource parameters;
identifying, from the query, each respective resource parameter that is associated with the one or more resources;
for each respective resource parameter identified, using the parameter mapping to determine each HTTP URL parameter from the plurality of HTTP URL parameters that is associated with the one or more resources specified in the query;
generating a single HTTP URL by combining each HTTP URL parameter determined for each respective resource parameter; and
transmitting a representational state transfer (REST) application programming interface (API) request based on the single HTTP URL, causing retrieval of the one or more resources from a server computer.

2. The method of claim 1, wherein the query is formatted according to a GRAPHQL data query language.

3. The method of claim 2, wherein
the schema is defined by a schema definition language (SDL).

4. The method of claim 1, wherein the schema indicates querying operations and mutating operations supported by the graph query language processing system.

5. The method of claim 1, wherein the one or more resources includes one or more nested resources.

6. The method of claim 5, wherein a nested resource of the one or more nested resources comprises a resource that is logically a child of another resource of the one or more resources.

7. The method of claim 1, wherein combining each HTTP URL parameter comprises concatenating each HTTP URL parameter into the single HTTP URL.

8. The method of claim 1, wherein the single HTTP URL defines an entry point to a REST API of the server computer.

9. The method of claim 1, wherein the server computer is responsive to requests to a REST API of the server computer.

10. The method of claim 1, further comprising receiving, at the client computer and from the server computer, a response that includes the one or more resources.

11. A computer system comprising:
one or more processors; and
one or more memories storing instructions which, when executed by the one or more processors, cause the one or more processors to perform:
creating and storing a parameter mapping that maps a plurality of resource parameters to a plurality of hypertext transfer protocol (HTTP) uniform resource locator (URL) parameters;
receiving, at a client computer, a query based on a schema supported by a graph query language processing system and comprising a request to access one or more resources, each resource of the one or more resources associated with a respective resource parameter of the plurality of resource parameters;
identifying, from the query, each respective resource parameter that is associated with the one or more resources;
for each respective resource parameter identified, using the parameter mapping to determine each HTTP URL parameter from the plurality of HTTP URL parameters that is associated with the one or more resources specified in the query;
generating a single HTTP URL by combining each HTTP URL parameter determined for each respective resource parameter; and
transmitting a representational state transfer (REST) application programming interface (API) request based on the single HTTP URL, causing retrieval of the one or more resources from a server computer.

12. The system of claim 11, wherein the query is formatted according to a GRAPHQL data query language.

13. The system of claim 12, wherein
the schema is defined by a schema definition language (SDL).

14. The system of claim 11, wherein the schema indicates querying operations and mutating operations supported by the graph query language processing system.

15. The system of claim 11, wherein the one or more resources includes one or more nested resources.

16. The system of claim 15, wherein a nested resource of the one or more nested resources comprises a resource that is logically a child of another resource of the one or more resources.

17. The system of claim 11, wherein combining each HTTP URL parameter comprises concatenating each HTTP URL parameter into the single HTTP URL.

18. The system of claim 11, wherein the single HTTP URL defines an entry point to a REST API of the server computer.

19. The system of claim 11, wherein the server computer is responsive to requests to a REST API of the server computer.

20. The system of claim 11, further comprising receiving, at the client computer and from the server computer, a response that includes the one or more resources.

* * * * *